April 10, 1928.
F. L. SIMMONS
MAGNETIC CHUCK
Filed Jan. 10, 1927 4 Sheets-Sheet 1
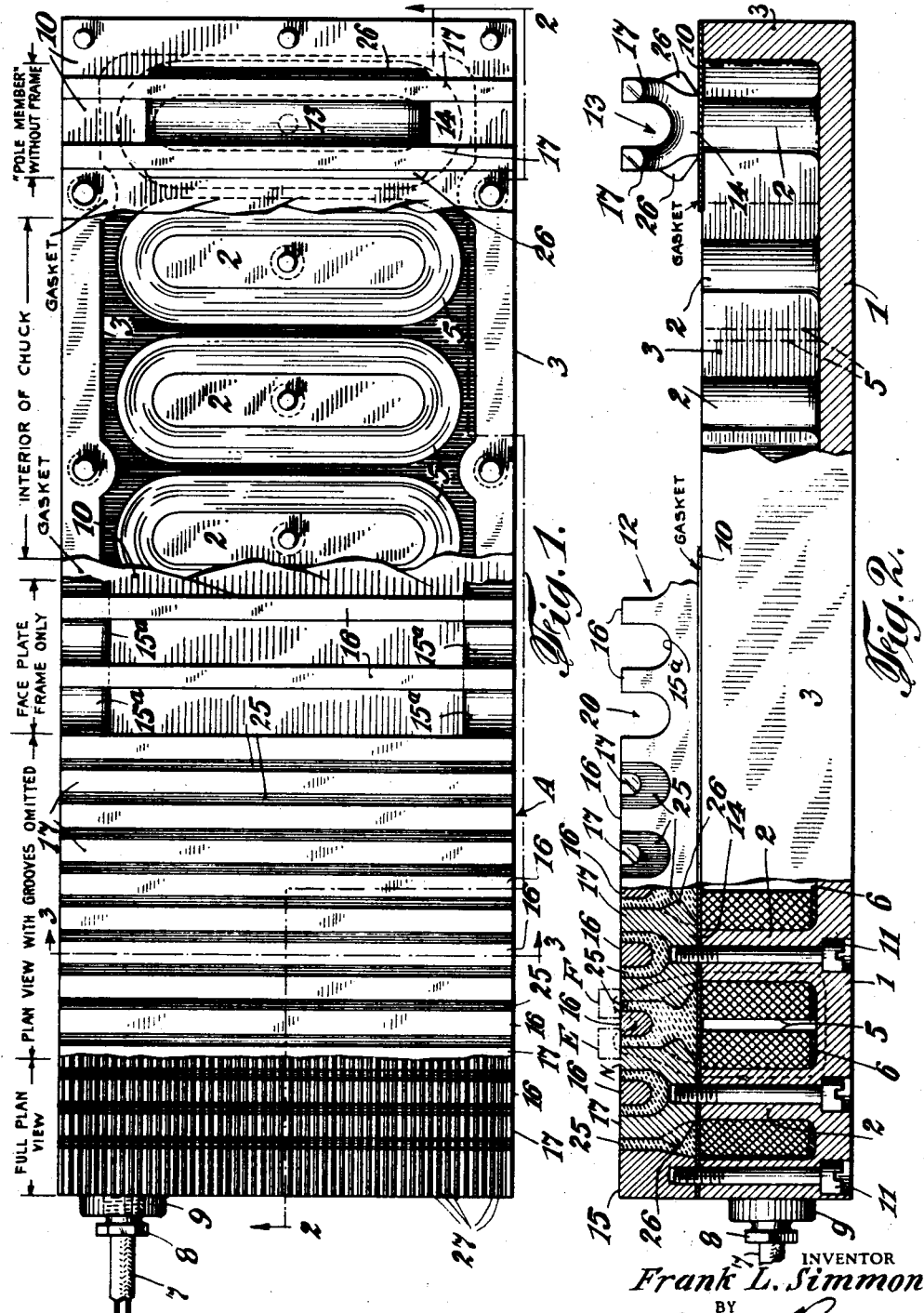
INVENTOR
Frank L. Simmons
BY
his ATTORNEY April 10, 1928.  
F. L. SIMMONS  
MAGNETIC CHUCK  
Filed Jan. 10, 1927  
1,665,226  
4 Sheets-Sheet 2
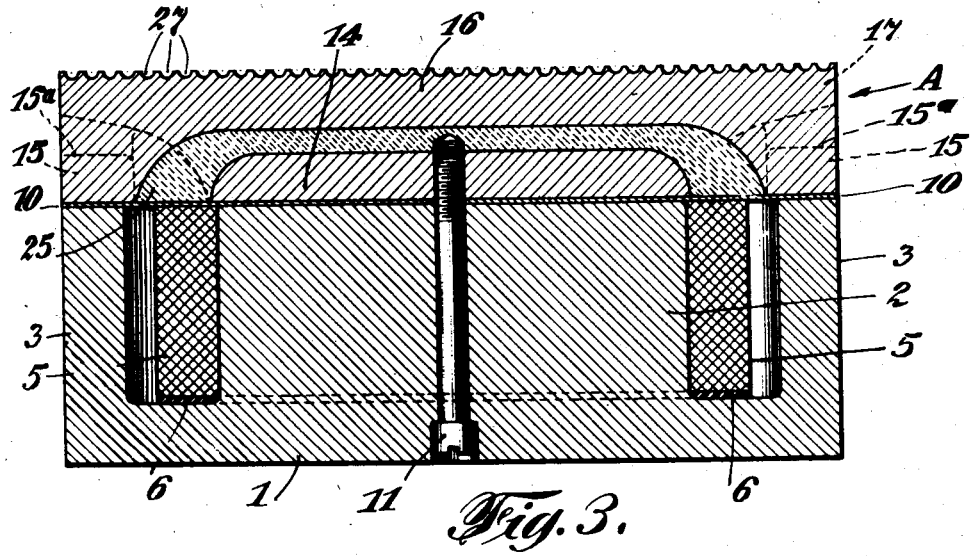
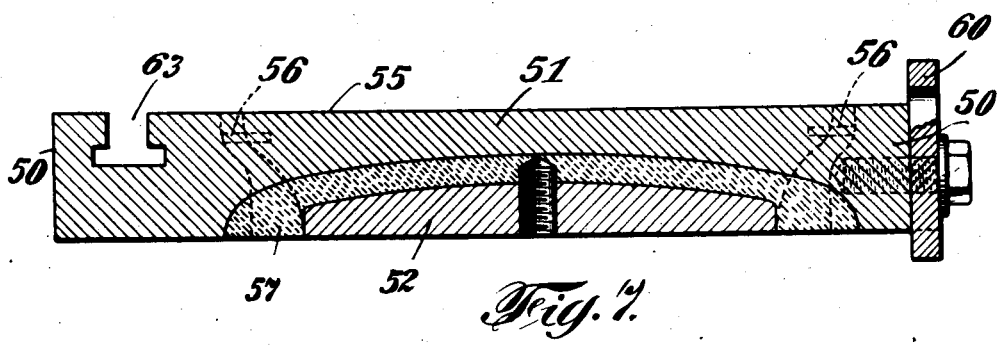
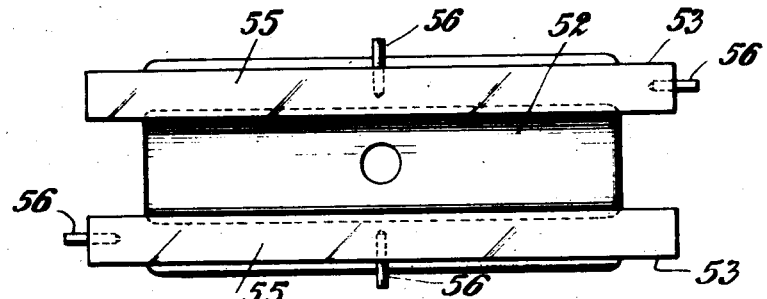
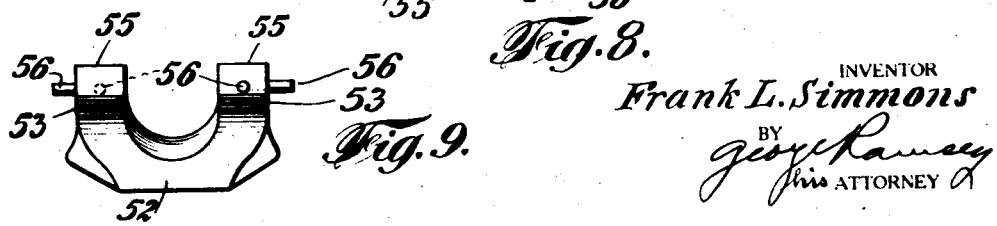
INVENTOR  
Frank L. Simmons  
BY  
his ATTORNEY

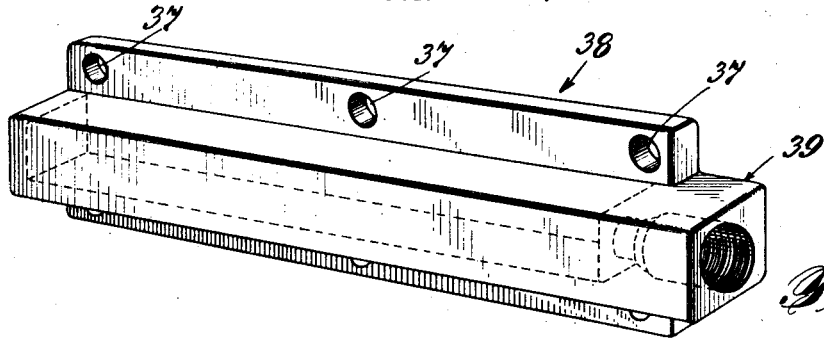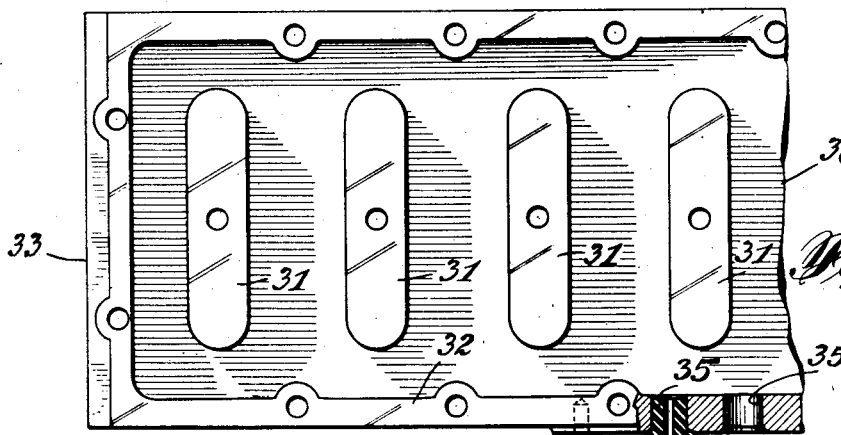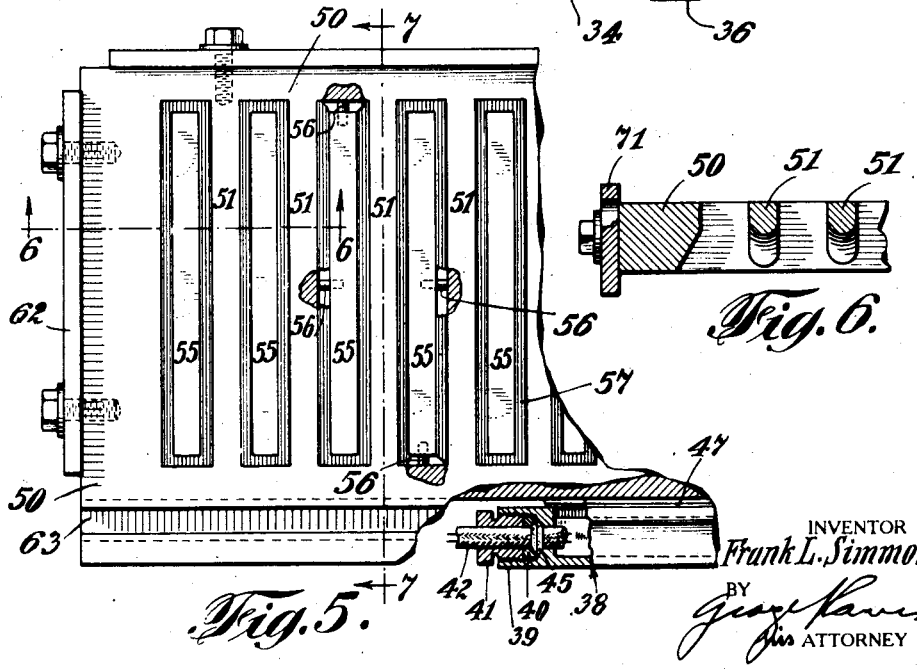

April 10, 1928.
F. L. SIMMONS
MAGNETIC CHUCK
Filed Jan. 10, 1927
1,665,226
4 Sheets-Sheet 4
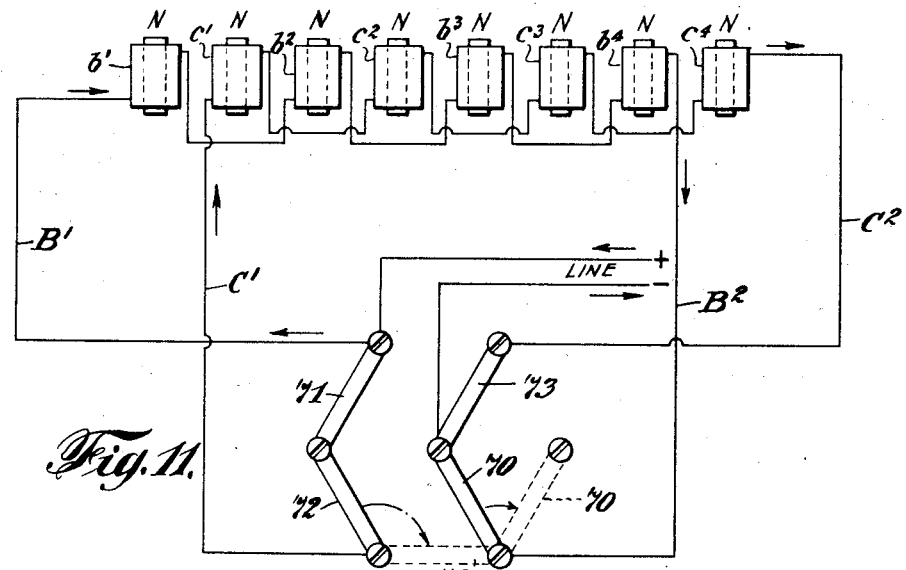
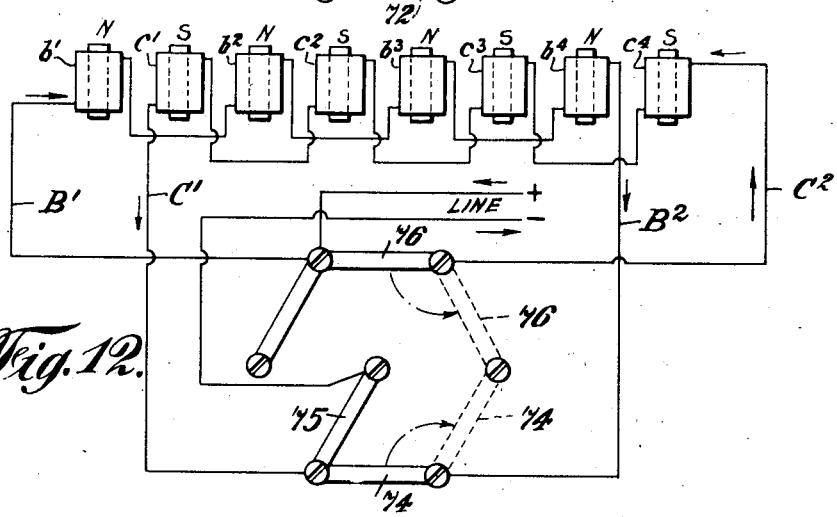
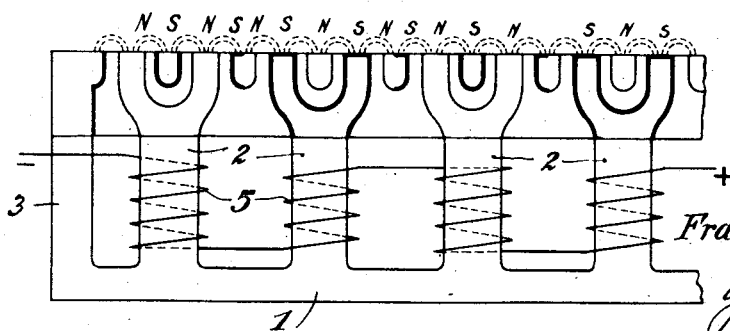
INVENTOR
Frank L. Simmons
BY
his ATTORNEY Patented Apr. 10, 1928.

1,665,226

UNITED STATES PATENT OFFICE.

FRANK L. SIMMONS, OF WOONSOCKET, RHODE ISLAND, ASSIGNOR TO THE TAFT-PIERCE MANUFACTURING COMPANY, OF WOONSOCKET, RHODE ISLAND, A CORPORATION OF RHODE ISLAND.

MAGNETIC CHUCK.

Application filed January 10, 1927. Serial No. 160,267.

This invention relates to magnetic chucks and is particularly applicable to magnetic chucks of the non-rotating type.

Magnetic chucks are used to hold articles of widely varying sizes and shapes, for both grinding operations and machine tool operations. In general, the prior art chucks which have been adapted for one class or type of service have not been well adapted to other classes of service.

In grinding very rigid articles or pieces, it is feasible to use a chuck which produces a very intense holding flux. The rigidity of the pieces prevents them from being distorted by the strong magnetic pull, and since the grinding wheel is non-magnetic it does not pick up stray flux. On the other hand, a very intense flux is apt to distort thin or frail pieces, and in machine tool operations it causes difficulty through flux passing to the tool, which is of magnetic material.

In general the chucks of the prior art have produced a flux irregularly distributed over the face of the chuck. This is frequently good enough for relatively large pieces, but has caused much difficulty in the holding of small pieces since a small piece may be positioned where it receives only a very weak flux. Increasing the total magnetomotive force for the chuck will tend to strengthen the flux where it is already intense as well as where it is weak, and hence may complicate matters by causing much more flux to pass to a machine tool or the like used in connection with the chuck. Furthermore, it adds distinctly to the cost, both manufacturing cost of the chuck itself and operating cost. Larger energizing coils must be used and more power expended in energizing them.

The practical result has been that different chucks have been built for each of the various classes of service to be rendered. The chuck manufacturers have been put to the expense of producing many designs of chucks and users put to the expense of buying as many chucks as they had classes of operations to perform. In some instances special forms of holding poles have been necessary and in others it has been necessary to utilize special work supporting blocks constructed to correspond to the pole arrangement of the chuck.

The principal and general object of the present invention is to provide a magnetic chuck construction, which construction adapts the chuck for holding a wide variety of sizes and shapes of articles for both machine tool and grinding operations.

Another object of the invention is to produce a so-called universal magnetic chuck which is rugged in construction and inexpensive to manufacture and operate.

Another object of the invention is to produce a magnetic chuck of small height whereby the chuck occupies a minimum amount of the space between the tool or grinding wheel and the bed of a machine upon which the chuck may be mounted.

A further object is to produce a chuck which will have such uniform flux distribution that very small pieces will be firmly held anywhere on the face of the chuck.

In accordance with the above and other objects of the invention, applicant has provided a so-called universal magnetic chuck (i. e. suitable for holding many sizes and shapes of articles) by so constructing the chuck that a practically uniform holding flux, either intense or moderate, may be delivered throughout the entire face of the chuck. The uniform distribution of flux throughout the entire face of the chuck prevents it from having any dead spots or weak spots even for very small articles. Hence, the chuck is adapted for holding all sizes of articles from very small articles to very large articles. The construction is such that the chuck may be connected either to produce a very powerful flux at the work-face, if such flux is desired, or to produce a moderate flux, if a strong flux would not be desirable, as in the case of machining of very thin material with a magnetizable tool.

In the form of the invention disclosed, the chuck is provided with a face plate comprising a rectangular magnetizable frame traversed by a series of closely spaced bars of magnetic material. Each bar has a surface forming a pole face in the work face of the chuck. Mechanically united with this frame, but magnetically separated therefrom is a series of bifurcated pole members. Each bifurcated pole member has a flat base portion (adapted to cooperate with a chuck core) and a pair of bar-like upstanding poles which are interspersed with the bars traversing the frame.

The face plate is shown as applied to a chuck body comprising a shell which encloses a series of magnetically energized cores. The rectangular frame of the face plate registers with the shell of the chuck body and the base of each bifurcated pole member registers with one of the cores. The cores are energized by individual coils and preferably there are an even number of coils with alternate coils permanently connected in series in one circuit and the intermediate coils similarly connected in another circuit. Separate leads for each circuit may be brought out from the interior of the chuck, thus enabling the two circuits to be connected in parallel for 110 volt service, or in series for 220 volt service. In either case, the connections can be so made that all cores are positively magnetized or so that alternate cores are positively magnetized with the intermediate cores negatively magnetized, whenever is desired.

Fig. 1 is a plan view of one form of the present invention with various parts of the face plate cut away, or omitted, to bring out the details of construction.

Fig. 2 is a side view of the chuck shown in Fig. 1. The figure is taken approximately on line 2—2 of Fig. 1, and parts of the chuck are cut away, or omitted, to bring out the details of construction.

Fig. 3 is a sectional view taken on the line 3—3 of Fig. 1.

Fig. 4 is a fragmentary plan view, partially in section, showing a chuck body for a modified form of the invention.

Fig. 5, is a fragmentary plan view, partially in section, of the modified form of the chuck.

Fig. 6 is a fragmentary detail sectional view of the face plate frame shown in Fig. 5 and taken on line 6—6 of that figure.

Fig. 7 is a sectional view of the face plate shown in Fig. 5 and taken on line 7—7 of that figure.

Fig. 8 is a plan view of one of the pole members of the face plate shown in Figs. 5 and 7.

Fig. 9 is an end elevation of the pole member shown in Fig. 8.

Fig. 10 is a perspective view of an outlet box for the chuck.

Fig. 11 is a schematic diagram showing the wiring and switching connections for positively magnetizing all the cores.

Fig. 12 is a schematic diagram showing the wiring and switching connections for positively magnetizing alternate cores and negatively magnetizing the intermediate cores.

Fig. 13 is a diagrammatic longitudinal sectional view of the chuck, showing the flux distribution at the face of the chuck when connected as in Fig. 12.

Reference will first be had to Figs. 1, 2, and 3. In these figures the chuck body comprises a base portion 1 from which project a plurality of upstanding cores 2 enclosed collectively by a wall 3. Each of the cores is adapted to be magnetically energized by a coil 5 resting upon a suitable piece of insulating material 6, such as mica or the like. These coils are suitably connected together, and are energized by current conducted to the interior of the chuck by a flexible cord 7 passing through a bushing 8 screwed into a boss 9. Preferably there is a water tight joint about the cord at this point made in a manner to be described later.

After the coils 5 have all been put in place and electrically connected, the chuck may be "potted," i. e., the space surrounding the coils filled with a suitable insulating material poured in a liquid state and allowed to harden. Such insulating material fills up all the voids within the chuck, acting to hold the coils in place and to furnish a medium for conducting heat from the coils to the wall of the chuck.

The chuck is provided with a face plate which has an "upper" or work surface and a "lower" surface parallel to the upper surface. The lower surface rests directly against a gasket 10 of suitable material such as sheet tin. This gasket is solid except where traversed by bolts, such as 11, holding the face plate to the chuck body, and makes a water-tight joint that prevents grinding fluids or the like from reaching the interior of the chuck.

The face plate is formed from a grid-like pole member, denoted as a whole by 12, and a series of bifurcated pole members each denoted as a whole by 13. The grid-like pole member 12 is magnetically associated with the body wall 3 and each pole member 13 is magnetically associated with one of the cores 2. The grid-like pole member consists of a rectangular frame 15 (which registers with the upper edge of the wall 3) and a plurality of parallel spaced bars 16 which extend from one side of the frame 15 to the other, with their ends integral with the sides of the frame 15. Each of these bars 16 has a rectangular surface in the work face of the chuck, which surface forms a face plate pole face.

Each of the bifurcated pole members 13 has a base portion 14 with a flat surface located in the lower surface of the face plate and registering with one of the cores 2. Extending upwardly from the base portion of each pole member 13 is a pair of edgewise disposed bar-like pole pieces 17. Pole pieces 17 have holding faces positioned as shown in Figures 1 and 2, between the holding faces of bar-like members 16 of the grid-like pole member 12. As shown in the drawings, the frame 15 is so constructed that there is a space 20 (Fig. 2) between the ends of adjacent bars 16 and the ends of poles 17 extending, after the manner of a horn, into spaces 20 to the very edge of the face plate. The horn-like ends of the poles 17 overlie the portions 15ª of the frame as shown in Figs. 2 and 3.

The pole members 13 are so shaped and positioned with reference to the grid-like pole member 12 that they are at all points magnetically separated and insulated from the pole member 12. However, the grid-like pole member and the series of bifurcated pole members 13 are mechanically united together into a rigid face plate unit by suitable non-magnetic material 25 such as Babbitt metal or the like, which is molded into the space separating pole members 13 from the grid-like pole member 12. Each of the pole members 13 is provided with a pair of horizontally projecting beads 26 which act to support the non-magnetic material 25 and interlock the pole members 13 with the non-magnetic material.

The chuck shown in Figs. 1, 2, and 3 is suitable for holding a multiplicity of pieces of wire of the same length as the chuck, for use in making steel wool. To this end the surface of the face plate may be provided with a series of grooves 27 to receive the wire. The holding face of this form of chuck extends to its very edge and hence when used in steel wool manufacture a series of chucks can be mounted upon an endless chain conveyor with the edge A of one chuck abutting the edge A of the next chuck, thus forming in effect a conveyor with a continuous magnetic holding surface.

The chuck shown in Figs. 4 to 9 is similar to that shown in Figs. 1 to 3 but the holding faces of the bifurcated pole members do not extend to the edge of the chuck. As shown in Fig. 4, this form of the chuck embodies a housing comprising a base portion 30 from which project a plurality of upstanding cores 31 enclosed collectively by a wall 32. At the end of the chuck there may be provided a projecting lip 33 at the base of the chuck, adapted to receive a suitable clamp to secure the chuck to the bed of a machine. The front of the wall 32 is provided with an integral raised portion or pad 34 through which four holes 35 (only two shown) extend to the interior of the chuck. Each of these holes 35 is provided with a suitable bushing 36 of hard rubber or the like through which lead wires extend for the energizing coils of the chuck. The manner of making the circuit connections will be described later.

The raised portion or pad 33 is adapted to be covered by a suitable terminal box denoted as a whole by 38 (Fig. 10). One end of the terminal box is provided with a threaded boss 39 adapted to receive a loose bushing 40 (Fig. 5) and a threaded bushing 41. A suitable electric cord 42 for conducting the current to the chuck extends into the terminal box 38 through the boss 39 and is surrounded by a suitable rubber gasket or the like 45, which is compressed by the bushing 40, thus making a water-tight joint about the cord. This arrangement of water-tight packing may be used at the boss 9 in Fig. 1, where the cord passes into the chuck.

The terminal box is secured to the chuck in a suitable manner as by screws passing through holes 37 (Fig. 10). These holes are positioned symmetrically about a center line so that the box may be mounted with the boss 39 on either the right end or left end, as desired. Between the terminal box 38 and the raised portion 33 on the chuck wall is a suitable gasket 47 which makes a water-tight joint. It is apparent that the box 38 is water-tight and hence grinding fluid or the like, used in wet grinding, can not reach the interior of the terminal box or the interior of the chuck.

In this modified form of the chuck the face plate is similar to the face plate of Figs. 1 to 3, being constructed from a single grid-like pole member and a series of bifurcated pole members. The grid-like pole member comprises a rectangular frame 50 traversed by a series of parallel spaced bars 51 extending from one side of the frame to the other and integral therewith. As shown more especially in Figs. 7, 8 and 9, each of the bifurcated pole members comprises a base portion 52 from which projects a pair of upstanding bar-like pole pieces 53 which extend between the bars 51 of the grid-like pole member and terminate in pole faces 55 in the work face of the face plate. Each of the bifurcated pole members may be provided with several projecting pins 56 of non-magnetic material which, as shown in Figs. 5 and 7, contact with portions of the grid-like pole member. These pins serve to hold the bifurcated pole members in desired position with reference to the grid-like pole member while non-magnetic material 57 such as Babbitt metal or the like is being molded about the bifurcated pole members to mechanically unite them with the grid-like pole member.

If desired, one long edge of the face plate may be provided with an adjustable stop 60 (Figs. 5 and 7), for use in positioning articles upon the chuck; and one end of the face plate may be provided with a similar adjustable stop 62 (Fig. 5). The chuck may also be provided with a T-slot 63 adapted to receive the head of a bolt (not shown), which may be used in clamping articles to the chuck.

In both forms of the chuck disclosed there are eight cores, and Figs. 11 and 12 show the electrical connections for the coils. Alternate coils are denoted by $b'$, $b^2$, $b^3$, and $b^4$, and the intermediate coils by $c'$, $c^2$, $c^3$, and $c^4$. Coils $b'$, $b^2$, $b^3$, and $b^4$ are connected in series and their lead wires B' and B² are brought out through two of the rubber bushings 36 (Fig. 4) into the terminal box 38. Similarly coils $c'$, $c^2$, $c^3$, and $c^4$ are connected together in series and their lead wires C' and C² are brought out through the other two of the rubber bushings 36 into the terminal box 38. This arrangement makes it possible, by merely having access to the terminal box, to connect the two sets of coils either in series or parallel with each other (thus adapting the chuck for either 110 volt or 220 volt service). In either case the connections can be so made that all chuck cores will be magnetized in the same direction (e. g. all positively) or so that alternate cores will be north poles and the intermediate cores south poles, whichever is desired. Such connections may be effected by means of suitable switching mechanism, e. g. switching links 70, 71, 72, etc. (Figs. 11 and 12), extending between suitable screws and binding posts arranged in the manner of a hexagon. These screws may be mounted upon insulating material and positioned in terminal box 38 in any suitable manner.

Fig. 11 shows the connections to produce north poles of all the cores, for either 110 volt or 220 volt operations. With the switching links arranged as shown in full lines in Fig. 11, the set of coils $b'$, $b^2$, $b^3$, and $b^4$ is connected in parallel with the other set of coils $c'$, $c^2$, $c^3$, and $c^4$, thus adapting the chuck for 110 volt operations. The circuit through the first set of coils is from the plus side of the power line to lead wire B', coils $b'$, $b^2$, $b^3$, and $b^4$, lead wires B² and switching link 70 to the negative side of the power line. Similarly the circuit through the second set of coils is from the positive side of the power line to switching links 71 and 72, lead wire C', coils $c'$, $c^2$, $c^3$, and $c^4$, lead wire C², and switching link 73 to the negative side of the power line.

To connect the chuck for 220 volt operation without changing the polarity of any of the cores, it is merely necessary to shift switching links 70 and 72 to the positions shown in dotted lines in Fig. 11. The circuit is then from the positive side of the power line to lead wire B', coils $b'$, $b^2$, $b^3$, and $b^4$, lead wire B², link 72, lead wires C', coils $c'$, $c^2$, $c^3$, and $c^4$, lead wire C² and link 73 to the negative side of the power line.

Fig. 12 shows the circuit connections for energizing alternate cores positively and intermediate cores negatively, for either 110 volt or 220 volt operation. With the switching links in the position shown in full lines coils $b'$, $b^2$, $b^3$ and $b^4$ are in parallel with coils $c'$, $c^2$, $c^3$, and $c^4$, thus adapting the chuck for 110 volt operation. The first circuit may be traced from the positive side of the power line to lead wire B', coils $b'$, $b^2$, $b^3$ and $b^4$, lead wire B², and switching links 74 and 75 to the negative side of the power line. The second circuit may be traced from the positive side of the power line to link 76, lead wire C², coils $c^4$, $c^3$, $c^2$ and $c'$, lead wire C', and link 75 to the negative side of the power line.

To adapt the chuck to 220 volt operation without changing any of the core polarities it is merely necessary to shift switching links 74 and 76 to the positions shown in dotted lines in Fig. 12. This places coils $b'$, $b^2$, $b^3$, and $b^4$ in series with coils $c'$, $c^2$, $c^3$, and $c^4$, in a circuit traceable from the positive side of the power line to lead wire B', coils $b'$, $b^2$, $b^3$ and $b^4$, lead wire B², switching links 74 and 76, lead wire C², coils $c^4$, $c^3$, $c^2$, and $c'$, lead wire C', and switching link 75 to the negative side of the power line.

Since the power leads and lead wires B' and B², and C' and C² are all brought into the terminal box 38, it is apparent that the switching links shown in Figs. 11 and 12 may be omitted and the desired connections made by appropriately soldering the leads together and taping the joints. This is satisfactory where a chuck is to be permanently or semi-permanently installed for some one class of service.

Where the wires are brought out through a boss as shown in Figs. 1 and 2, connections cannot be readily changed after the chuck has been built and hence the class of service must be known when the chuck is manufactured. However, bringing all the leads into a terminal box as in Figs. 4, 5, and 10 (even without switching links) enables the manufacturer to meet the users' needs for various classes of service from a stock of only one design of chuck. Thus the number of chucks which the manufacturer must carry in his stock is minimized. The invention contemplates using either method of bringing out the leads with either of the forms of chuck disclosed.

The strongest holding force is obtained by connecting the coils so that alternate cores are positively magnetized and the intermediate cores negatively magnetized as in Fig. 12. With such connections the bars 16 (Fig. 2) of the face plate frame will become either north or south poles depending upon how work pieces are placed on the chuck. In Fig. 2 consider that the left hand core 2 is a north pole and the adjacent or second core is a south pole. If a work piece be placed as at E the frame bar 16 engaged by E will become a south pole, flux passing from piece E to the bar 16 from which it returns to the bottom of the left hand core 2 via frame 15, wall 3, and base 1. If a work piece be placed as at F the same frame bar will become a north pole, flux passing from the bottom of the second core 2 to base 1, wall 3, face plate frame 15, and bar 16 to piece F from which it returns to the second core 2 as indicated in dotted lines. If work pieces be at E and F simultaneously, the flux will pass as indicated by the dotted line from the left hand core 2, to piece E, frame bar 16, piece F, second core 2 and base 1 back to the bottom of the first core 2.

The magnetic arrangement of the chuck just described produces such an intense, evenly distributed flux at the chuck face that pieces can be held by laying solid steel parallels on the face of the chuck and holding work pieces by them. This makes it unnecessary in many cases to use specially constructed supporting blocks of the general type heretofore common in the art.

When a more moderate holding flux is desired the coils may be connected to magnetize all cores in the same direction, e. g., positively, as in Fig. 11. With such connection all face plate poles 17 in Figs. 1 and 2 (55 in Figs. 5 to 9) are north poles and all poles 16 in Figs. 1 and 2 (51 in Figs. 5 to 9) are south poles.

The magnetic parts of the chuck are made of suitable magnetic material, mild steel preferably being used for all of them because of its high permeability and magnetic saturation point. High permeability of the magnetic parts makes for low requirements as to magnetomotive force, thus making for small energizing coils and small power consumption. High saturation point makes it possible to use cores and walls of small cross sectional area, thus allowing a maximum amount of room laterally for the coils. The coils being relatively small and broad, the total height of the chuck is minimized, thereby allowing maximum clearance between the chuck face and the grinding wheel or tool of a machine on which it is mounted.

For the sake of convenience in the specification and claims, the chuck has been shown in the non-rotative form and has been referred to as if it were in a horizontal position; but terms used in such connection are to be considered as relative only since the inventions may be embodied in a rotative chuck and use of the chuck in any desired position is contemplated. Similarly, reference has been made to voltages of 110 and 220 volts because they are standard values. However, it is obvious that the chuck may be designed to operate on almost any voltage.

It is realized that the present invention may be embodied in forms other than those particularly disclosed and hence it is desired that the present disclosure shall be considered as illustrative and not in the limiting sense.

Having thus described my invention, what I claim is:

1. A pole member for magnetic chuck face plates comprising a base portion having a plane surface adapted to cooperate with a chuck core; a pair of separated edgewise positioned bar-like pole pieces extending upwardly from said base portion, the upper edges of said pole pieces being formed into surfaces adapted to form pole faces in the work face of a face plate; and laterally projecting means to form an interlock with material molded about the pole member.

2. A pole member for magnetic chuck face plates comprising a base portion having a plane surface adapted to cooperate with a chuck core; a pair of separated edgewise positioned bar-like pole pieces extending upwardly from said base portion, the upper edges of said pole pieces being formed into surfaces adapted to form pole faces in the work face of a face plate; and a pair of laterally projecting horizontally extending beads to form an interlock with material molded about the pole member, said beads being positioned adjacent the base portion of the pole member.

3. A pole member for magnetic chuck face plates comprising a base portion having a plane surface adapted to cooperate with a chuck core; a pair of separated edgewise positioned bar-like pole pieces extending upwardly from said base portion, the upper edges of said pole pieces being formed into surfaces adapted to form pole faces in the work face of a face plate; and a pair of laterally projecting horizontally extending beads to form an interlock with material molded about the pole member.

4. A pole member for magnetic chuck face plates comprising a base portion having a plane surface adapted to cooperate with a chuck core, and a pair of separated horizontally positioned straight bar-like pole pieces extending upwardly from said base portion, the upper extremities of said pole pieces being formed into surfaces adapted to form pole faces in the work face of a face plate.

5. A pole member for magnetic chuck face plates comprising a base portion having a plane surface adapted to cooperate with a chuck core, and a pair of separated horizontally positioned straight bar-like pole pieces extending upwardly from said base portion, the ends of said pole pieces overhanging said base portion and the upper extremities of said pole pieces being formed into surfaces adapted to form pole faces in the work face of a face plate.

6. A pole member for magnetic chuck face plates comprising a base portion having a plane surface adapted to cooperate with a chuck core, a pair of separated horizontally positioned bar-like pole pieces extending upwardly from said base portion, the upper extremities of said pole pieces being formed into surfaces adapted to form pole faces in the work face of a face plate, and means projecting laterally from said bar-like pole pieces to engage a face plate frame and hold the pole member in a desired position while non-magnetic material is being molded about the pole member.

7. A face plate for magnetic chucks comprising a frame of magnetic material having upper and lower plane surfaces parallel to each other; a series of spaced bars extending across said frame and integral therewith, each bar having a surface in the plane of the upper surface of the frame; and a plurality of bifurcated pole members, each pole member having a base portion positioned beneath one of said bars and adapted to cooperate with the end of a chuck core and also having a pair of bar-like pole portions extending between said bars, said pole portions having pole faces in the plane of the upper surface of the frame.

8. A face plate for magnetic chucks comprising a frame of magnetic material, a series of spaced bars extending across said frame and secured thereto, each bar having a surface comprising a portion of the work face of the face plate; and a plurality of bifurcated pole members, each pole member having a base portion adapted to cooperate with the end of a chuck core and also having a pair of pole portions extending to the work face of the face plate, said pole portions being positioned alternately with said bars.

9. A face plate for magnetic chucks comprising a frame of magnetic material establishing upper and lower surfaces substantially parallel to each other; a series of pole members each comprising a base portion having a plane surface adapted to cooperate with a chuck core and located in the plane of said lower surface; a pair of separated edgewise positioned bar-like pole pieces extending upwardly from said base portion, the upper edges of said pole pieces forming pole faces in the upper surface of the face plate; a series of bar-like pole pieces extending across said frame between the pole pieces of the pole members; non-magnetic material molded about said pole members to secure the pole members and frame together into a face plate; and means projecting from said pole members to form an interlock with the non-magnetic material.

10. A face plate for magnetic chucks comprising a frame establishing a work-face and a lower face substantially parallel to the work-face, and a series of spaced bar-like members extending across said frame and forming pole faces in the work face of the face plate; in combination with a series of pole members mechanically secured to and magnetically separated from the frame structure by molded non-magnetic material, each of said pole members comprising a base portion having a plane surface adapted to cooperate with a chuck core, a pair of edgewise positioned bar-like pole pieces extending upwardly from said base portion on opposite sides of a bar extending across said frame, the upper edges of said pole pieces being formed into pole faces in the work-face of the face-plate, and a pair of laterally projecting horizontally extending beads forming an interlock with the non-magnetic material molded about the pole members, said beads being positioned adjacent the base portion of the pole members.

11. A magnetic chuck face plate comprising a frame establishing upper and lower surfaces substantially parallel to each other and a series of spaced bar-like members extending across the frame, each of the bar-like members having a face located in the said upper surface; in combination with a series of pole members magnetically separated from and mechanically united with the frame by molded non-magnetic material, each of said pole members comprising a base portion adapted to cooperate with a chuck core and a pair of separated horizontally positioned straight bar-like pole pieces extending upwardly from said base portion, the ends of said pole pieces overhanging said base portion and the upper extremities of the pole pieces forming polar faces in the work face of the face plate.

12. A face plate for magnetic chucks comprising a frame establishing upper and lower surfaces substantially parallel to each other, and a series of bar-like members extending across said frame; in combination with a series of pole members magnetically separated from and mechanically united with said frame by molded non-magnetic material, each of said pole members comprising a base portion adapted to cooperate with the chuck core, a pair of separated horizontally positioned bar-like pole pieces extending upwardly from said base portion on opposite sides of a bar traversing said frame, the upper extremities of said pole pieces forming pole faces in the work face of the face plate, and non-magnetic means projecting laterally from said bar-like pole pieces and engaging said face plate frame.

13. A magnetic chuck comprising a housing of magnetic material; a terminal box on the exterior of said housing; a series of cores within said housing; a series of energizing coils for said cores, said coils being connected into a plurality of circuits; and means for connecting said circuits either to magnetize all cores in one direction or to magnetize alternate cores positively and intermediate cores negatively, said means comprising lead wires for the circuits extending from the interior of the housing into said terminal box.

14. A magnetic chuck comprising a housing of magnetic material; a terminal box on the exterior of said housing; a series of cores within said housing; a series of energizing coils for said cores, the coils for alternate cores being connected in series in one circuit and the coils for the intermediate cores being connected in series in a second circuit; and separate lead wires for the two circuits extending into the terminal box, whereby the chuck may be connected (without access to the interior of the housing) either to magnetize all cores alike in signs or to magnetize alternate cores positively and the intermediate cores negatively.

15. A magnetic chuck comprising a housing wall of magnetic material, and a series of cores within said wall; in combination with a face plate comprising a grid-like pole member magnetically associated with said wall and a series of bifurcated pole members magnetically associated with said cores, each bifurcated pole member having a pair of pole faces in the work face of the face plate and the grid-like pole member having pole faces interspersed with those of the bifurcated pole members.

16. A face plate for magnetic chucks comprising a frame and grid-bars forming a grid-like member, a bifurcated pole piece member enclosing the under portion of each alternate grid bar, and non-magnetic material separating said members.

17. A face plate for magnetic chucks comprising a frame and grid-bars forming a grid-like member, a plurality of bifurcated pole piece members, one of each bifurcated members enclosing the under portion of an alternate grid-bar, non-magnetic material separating said members, and electro-magnetic means to magnetize said bifurcated members to constitute opposite magnetic poles.

FRANK L. SIMMONS.

CERTIFICATE OF CORRECTION.

Patent No. 1,665,226.            Granted April 10, 1928, to

FRANK L. SIMMONS.

It is hereby certified that the name of the assignee in the above numbered patent was erroneously written and printed as "The Taft-Pierce Manufacturing Company", whereas said name should have been written and printed as The Taft-Peirce Manufacturing Company, as shown by the records of assignments in this office; and that the said Letters Patent should be read with this correction therein that the same may conform to the record of the case in the Patent Office.

Signed and sealed this 12th day of June, A. D. 1928.

(Seal)            M. J. Moore,
Acting Commissioner of Patents.